United States Patent [19]

Otaka

[11] Patent Number: 4,855,877
[45] Date of Patent: Aug. 8, 1989

[54] COMBINATION LAMP ASSEMBLY OF MONOCHROMATIC APPEARANCE CAPABLE OF GLOWING IN DIFFERENT COLORS

[75] Inventor: Nobuo Otaka, Shizuoka, Japan

[73] Assignee: Koito Seisakusho Co., Ltd., Tokyo, Japan

[21] Appl. No.: 278,204

[22] Filed: Nov. 30, 1988

[30] Foreign Application Priority Data

Dec. 1, 1987 [JP] Japan .................. 62-304116

[51] Int. Cl.$^4$ .............................. B60Q 1/26
[52] U.S. Cl. .......................... 362/61; 362/80; 362/309; 362/311; 362/332; 362/242
[58] Field of Search ............... 362/309, 311, 327, 329, 362/332, 290, 292, 307, 242, 244, 246, 248, 61, 80

[56] References Cited

U.S. PATENT DOCUMENTS

| | | |
|---|---|---|
| 2,220,832 | 11/1940 | Walker ............................. 362/246 |
| 3,487,206 | 12/1969 | Dawson et al. . |
| 4,241,388 | 12/1980 | Green .............................. 362/268 |
| 4,383,290 | 5/1983 | Binder et al. .................... 362/292 |
| 4,525,772 | 6/1985 | Peck ................................ 362/329 |
| 4,558,401 | 12/1985 | Tysoe ............................. 362/293 |
| 4,644,455 | 2/1987 | Inglis et al. .................... 362/309 |
| 4,811,179 | 3/1989 | Komatsu et al. ................ 362/293 |

FOREIGN PATENT DOCUMENTS 764984 3/1971 Belgium .............................. 362/332
2332824 1/1974 Fed. Rep. of Germany ...... 362/311

Primary Examiner—Ira S. Lazarus
Assistant Examiner—Sue Hagarman
Attorney, Agent, or Firm—Browdy & Neimark

[57] ABSTRACT

A combination lamp assembly suitable to be mounted to the rear of a motor vehicle, comprising a lamp housing defining two or more lighting compartments each having at least one light source mounted therein. In one embodiment the front ends of two lighting compartments are closed by respective inner lenses and further by two sections of a common outer lens. One of the outer lens sections is transparent and colored in red. The other outer lens section has alternating transparent stripes and opaque stripes. The transparent stripes are colorless whereas the opaque stripes are colored in red. When the light sources are unlit, the outer lens appears wholly red, due in part to the illusory effect of the opaque red stripes. However, when lit up, the two lamp units project red and white light through the transparent red section of the outer lens and through the colorless transparent stripes of the other outer lens section, respectively. Changes in color and in the arrangement and configurations of the lamp units are possible to provide various combinations of a tail and stop lamp, a backup lamp, a turn signal lamp, etc.

9 Claims, 9 Drawing Sheets

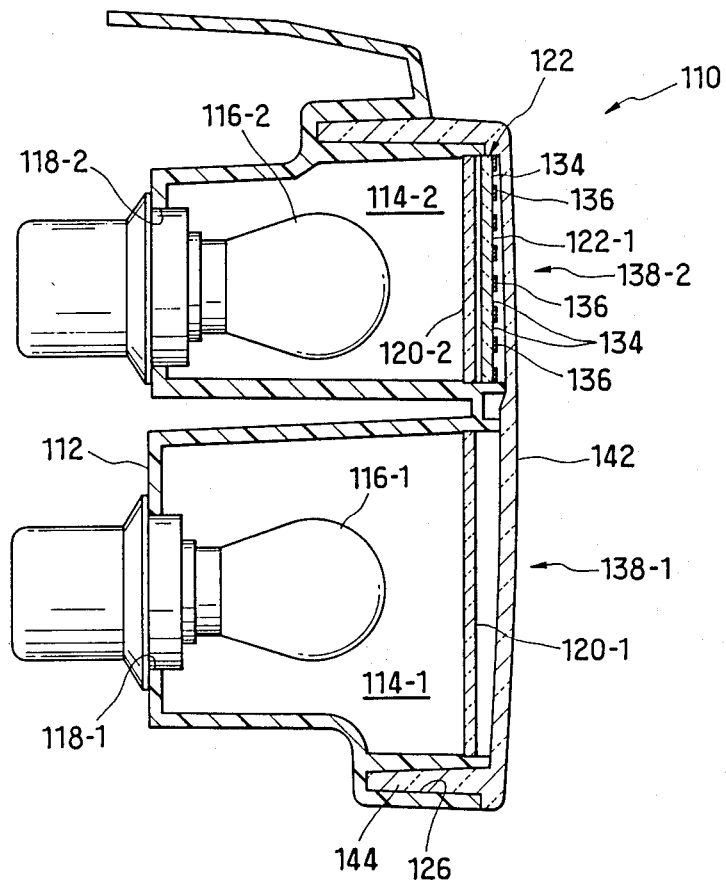

COMBINATION LAMP ASSEMBLY OF MONOCHROMATIC APPEARANCE CAPABLE OF GLOWING IN DIFFERENT COLORS

BACKGROUND OF THE INVENTION

My invention relates generally to electric lamps, and more specifically to a unitary combination of two or more lamp units of different functions. Still more specifically, my invention concerns such a combination lamp assembly of aesthetically favorable appearance suitable for use on motor vehicles, particularly on passenger cars, among other applications.

Motor vehicles today, passenger cars in particular, are furnished with a myriad of lighting devices intended for distinctly different functions. Such lighting devices include headlamps, turn signal lamps, tail lamps, stop lamps, backup lamps, etc. All these lighting devices are mounted in prescribed positions on the vehicle, and are to glow in prescribed colors, to perform the familiar functions for which they are intended.

The current trend of passenger car design is such that the lighting devices play an important part in the enhancement of the total aesthetic appeal of the car. Lighting devices merely designed for a fulfillment of the ultilitarian functions are unsatisfactory or, in some instances, objectionable from an aesthetic point of view. Some car designers strongly object to many lamp units of different colors mounted to the rear of the vehicle. The different colors of the many lamp units can ruin the total color scheme of the car. This is particularly so because the colors of such lamp units have conventionally remained the same both when they are lit up and unlit. Although the lamps must glow in the prescribed colors, they should desirably be more monochromatic when unlit. There have indeed been strong demands from the automotive industry for vehicle lamp assemblies that look like a single unit when unlit but which can glow in different colors to perform different lamp functions.

UMMARY OF THE INVENTION

I have hereby invented how to combine two or more different lamp units into a single lamp assembly which is totally monochromatic in appearance when unlit but which permits the individual lamp units to glow in different colors to perform the different functions for which they are intended.

Briefly, my invention may be summarized as a combination lamp assembly comprising a lamp housing defining at least two lighting compartments each having at least one light source mounted therein. The lighting compartments have open front ends which are closed respectively by first and second lens sections. The first lens section is transparent and has a preselected color. The second lens section has alternating transparent stripes and opaque stripes. The transparent stripes are colorless, and the opaque stripes have more or less the same color as the first lens.

In a preferred embodiment, in which the lamp assembly is shown as a unitary combination of a tail and stop lamp and a backup lamp by way of example, the first and second lens sections are of one piece construction. The first lens section is colored in transparent red. The second lens section is wholly transparent and colorless, and the opague stripes are formed by coating an opaque red paint in the form of parallel spaced stripes on the outside surface of the second lens section. The required colorless transparent stripes can then be provided by those portions of the second lens section itself which are left exposed between the opaque red coatings thereon.

Therefore, when the light sources are unlit, the first lens section appears red, of course, and the second lens section also appears red because of the illusory effect of the opaque red stripes which chromatically predominate the second lens section. Thus the combination lamp assembly gives the impression of a single lamp unit by virtue of its seemingly monochromatic appearance.

When lit up, one of the light sources will give red light through the first lens section which is colored in transparent red. The other light source will project white light through the colorless transparent stripes of the second lens section. Accordingly, the two lens sections of the combination lamp assembly will be recognized as the two different lamps performing different functions.

The above and other features and advantages of my invention and the manner of realizing them will become more apparent, and the invention itself will best be understood, from a study of the following description and appended claims, with reference had to the attached drawings showing some preferable embodiments of my invention.

BRIEF DESCRIPTION OF THE DRAWINGS

FIG. 9 is an enlarged vertical section through the alternative combination lamp assembly, taken along the line IX—IX in FIG. 6.

DESCRIPTION OF THE PREFERRED EMBODIMENTS

Figure 1:
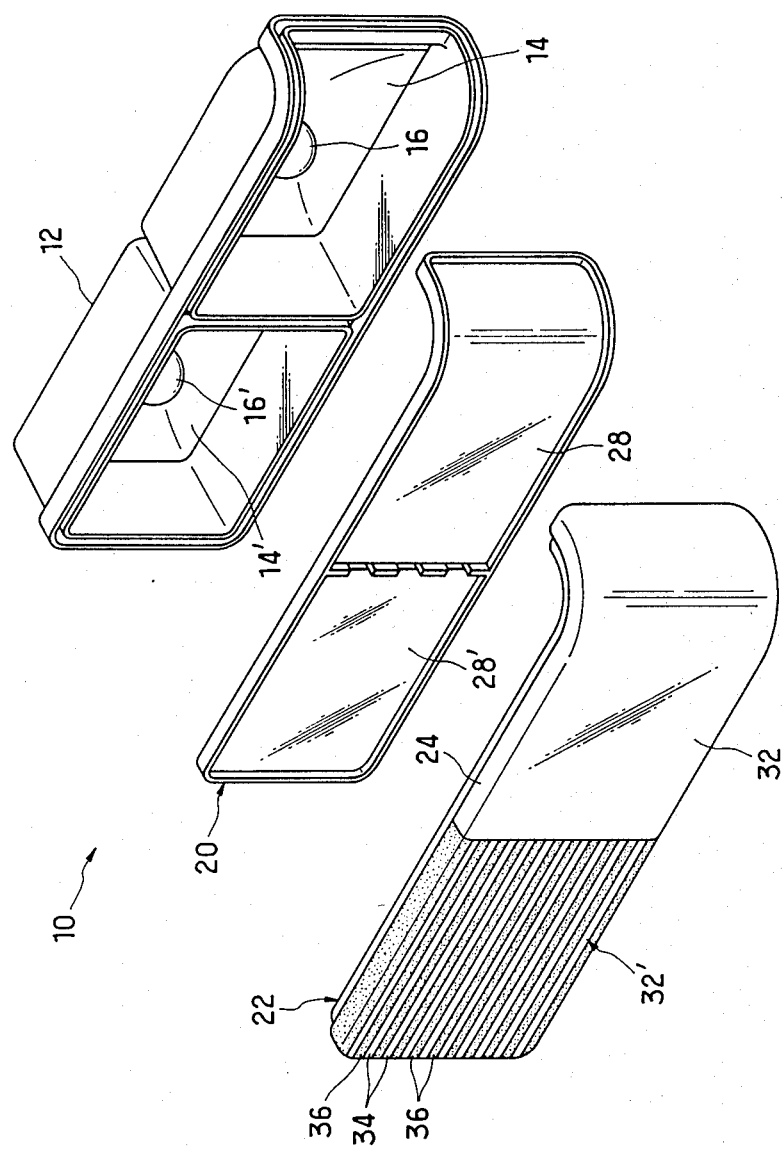
FIG. 1 is an exploded perspective view of the combination lamp assembly constructed in accordance with my invention, the lamp assembly being herein shown adapted for vehicular use as a combined tail and stop lamp and backup lamp.
Figure 2:
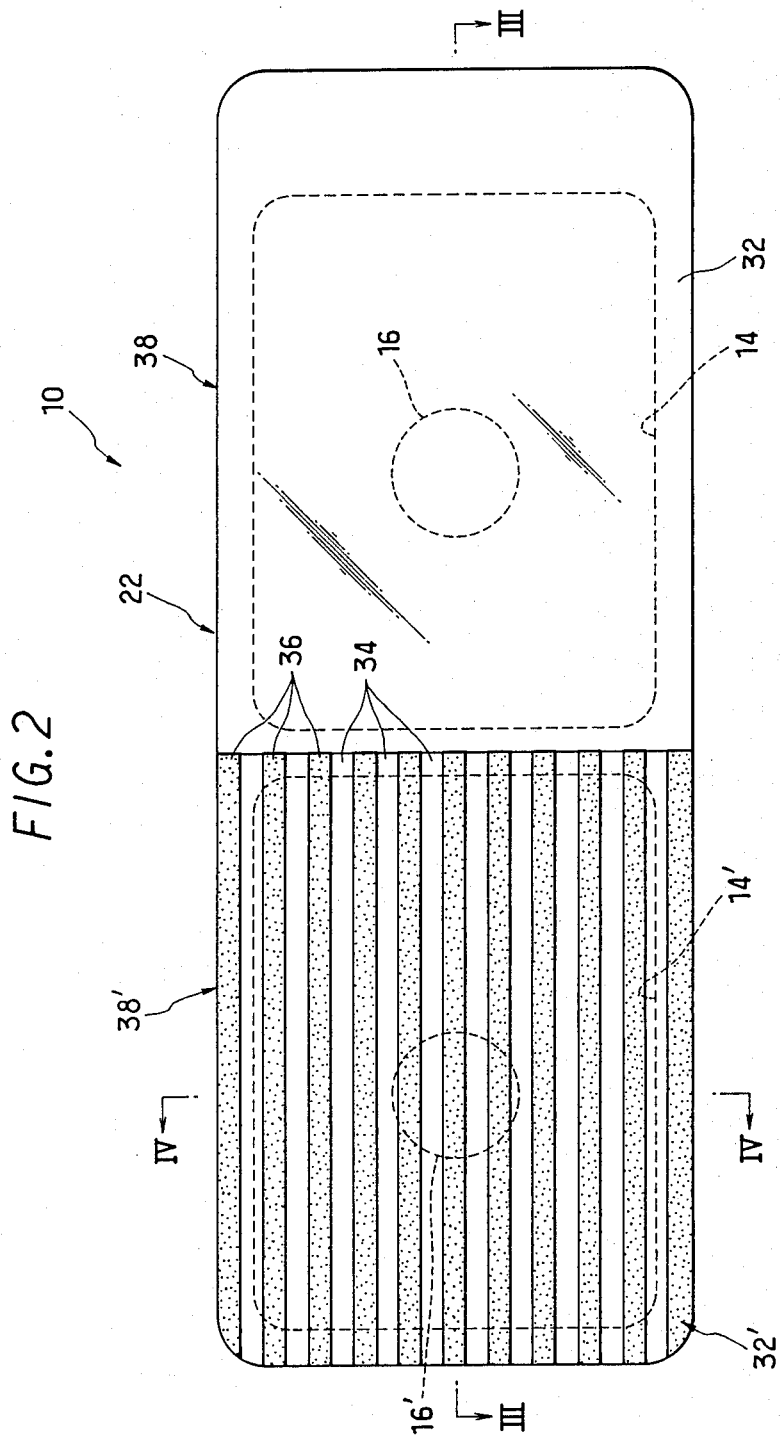
FIG. 2 is an enlarged front elevation of the combination lamp assembly of FIG. 1.

I will now describe my invention in detail as embodied in the combined tail and stop lamp and backup lamp assembly illustrated in FIGS. 1-4 and therein generally designated 10. The lamp assembly 10 has a lamp housing 12, FIGS. 1, 3 and 4, which may be molded from a plastic. The lamp housing 12 defines first 14 and second 14' lighting compartments in side by side arrangement which are both open forwardly, shown directed downwardly in FIG. 3 and leftwardly in FIG. 4, or rearwardly with respect to the vehicle to which this lamp assembly may be mounted. The lighting compartments 14 and 14' have light sources such as bulbs 16 and 16' mounted centrally to their rear walls. Holes 18 and 18' are formed in the rear walls of the lighting compartments 14 and 14' for supporting the bulbs 16 and 16'.

Closing the front ends of the lighting compartments 14 and 14' are an inner lens 20 and an outer lens 22, which are both of approximately rectangular shape. As will be noted from FIGS. 3 and 4, the inner lens 20 is closely engaged in an annular rim 24 extending along the periphery of the outer lens 22. Both lenses 20 and 22 are rigidly attached to the lamp housing 12 as the rim 24 of the outer lens is pressfitted in an annular groove 26 defined in the lamp housing.

Figure 3:
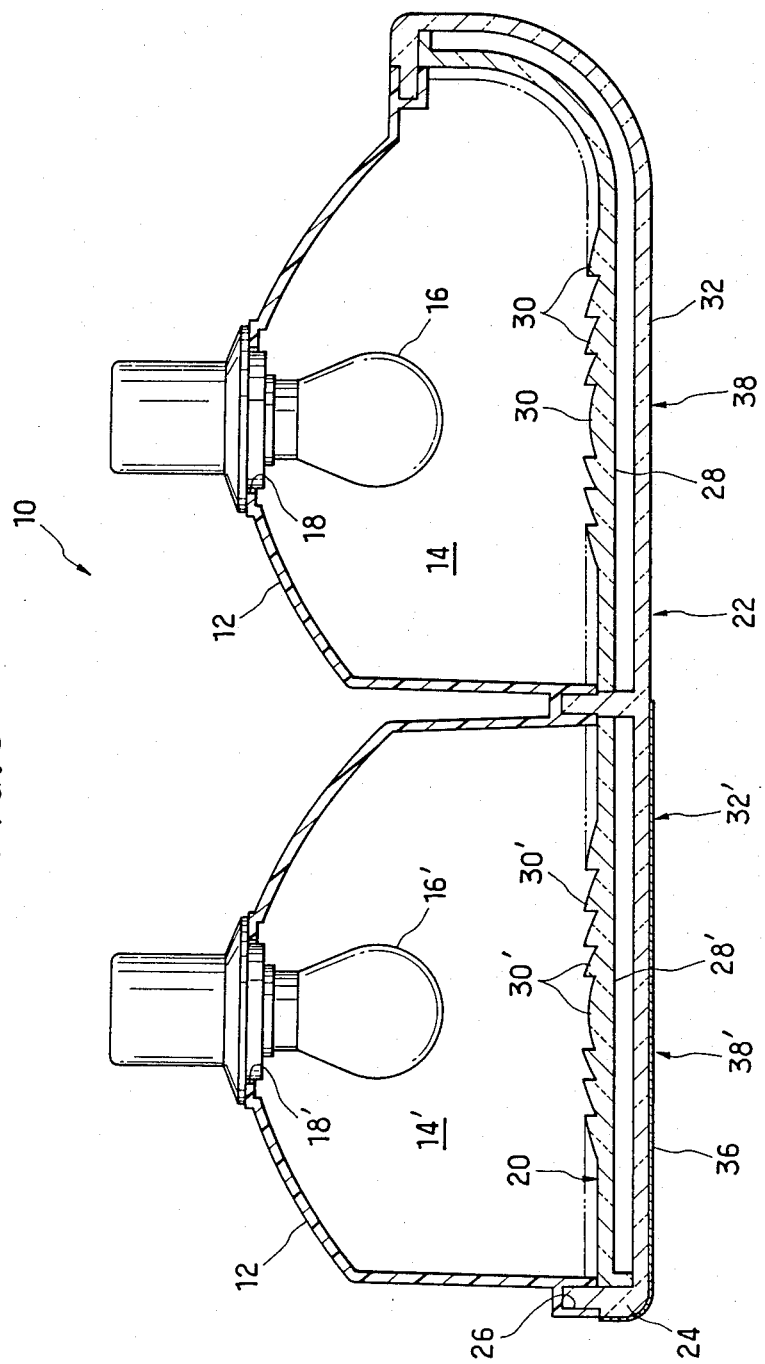
FIG. 3 is a horizontal section through the combination lamp assembly, taken along the line III—III in FIG. 2.
Figure 4:
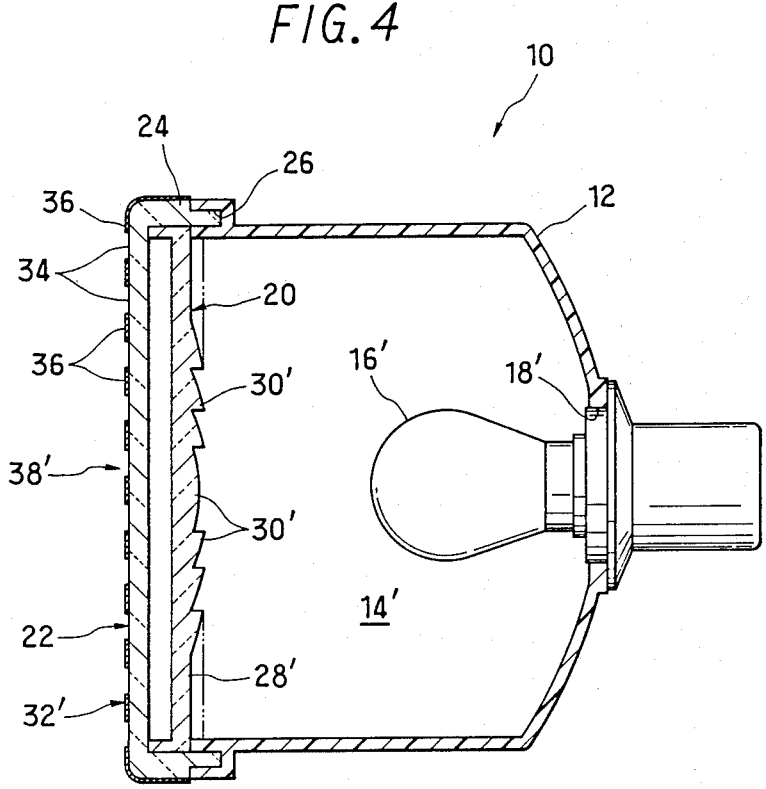
FIG. 4 is a vertical section through the combination lamp assembly, taken along the line IV—IV in FIG. 2.

Typically fabricated from a transparent plastic, the inner lens 20 comprises a first section 28 closing the front end of the first lighting compartment 14, and a second section 28' closing the front end of the second lighting compartment 14'. FIGS. 3 and 4 reveal concentric series of Fresnel setbacks 30 and 30' formed on the inside surfaces of the inner lens sections 28 and 28', in order to render parallel the rays of light emitted by the bulbs 16 and 16'.

The outer lens 22 may also be molded from a transparent plastic. This outer lens also integrally comprises a first section 32 disposed outwardly of the first inner lens section 28, and a second section 32' disposed outwardly of the second inner lens section 28'. The first outer lens section 32 is transparent and red in color in this particular embodiment.

The second outer lens section 32' has a plurality or multiplicity of transparent horizontal stripes 34 and a plurality or multiplicity of opaque horizontal stripes 36, the two groups of stripes 34 and 36 being arranged alternately. The transparent stripes 34 are colorless, and the opaque stripes 36 red in color, in this particular embodiment.

For the ease of production of the alternating transparent and opaque stripes 34 and 36, I suggest that the second outer lens section 32' be itself wholly molded from a transparent, colorless plastic. The opaque stripes 36 may be formed by coating an opaque red paint on the outside surface of the lens section 32', as best pictured in FIG. 4. The uncoated areas of the lens section 32' will then serve as the transparent stripes 34.

As will be readily understood by the automotive lighting specialists, the outer lens 22 may have its inside surface moled in any desired configurations for deflecting the parallel light rays from the inner lens 20, although I have shown the outer lens to be flat because of the optional nature of its inside surface configurations. For example, the first outer lens section 32 may have its inside surface formed in the shape of a convex or concave fisheye lens for suitably divering the light rays both vertically and horizontally. The second outer lens section 32' may be formed to include semicylindrical lens elements, each extending horizontally, on its inside surface for converging the light rays at the transparent stripes 34. In this case a set of semicylindrical lens elements may be formed vertically on the outside surface of the second inner lens section 28'. Then the two sets of horizontal and vertical lens elements on the inner and outer lens sections 2' and 32' will coact to emit a light beam that is divergent both horizontally and vertically.

There is thus completed a unitary combination 10 of a tail and stop lamp 38 and a backup lamp 38'. The tail and stop lamp 38 comprises the bulb 16 in the lighting compartment 14, the first section 28 of the inner lens 20, and the first section 32 of the outer lens 22. The backup lamp 38' comprises the bulb 16' in the lighting compartment 14', the second section 28' of the inner lens 20, and the second section 32' of the outer lens 22.

Normally, that is, when the bulbs 16 and 16' are unlit, the first outer lens section 32 appears red, the intrinsic color of this lens section. The second outer lens section 32' also appears red because of the illusory effect of the opaque red stripes 36 which predominate the second outer lens section. Thus, as the outer lens 22 which determines the appearance of the combination lamp assembly 10 appears wholly red, the two lamps 38 and 38' give the illusion of a single lamp unit.

The two lamps 38 and 38' are to glow in distinctly different colors, however. When the bulb 16 of the tail and stop lamp 38 is lit up, the tail and stop lamp 38 will glow red because of the transparent red coloration of the first outer lens section 32. The light emitted by the bulb 16' of the backup lamp 38', on the other hand, will pass only through the colorless transparent stripes 34, so that the backup lamp will glow white.

I recognize, of course, that the combination lamp assembly 10 is not limited to use as the tail and stop loop and backup lamp. For example, for use of the lamp section 38' as turn signal lamp, either the second inner lens section 28' may be colored in transparent amber, or an amber colored filter may be interposed between this lens section 28' and the light bulb 16'.

As a further possible modification of this combination lamp assembly 10, the first section 32 of the outer lens 22 may be colored in transparent amber, and the opaque stripes 36 of the second outer lens section 32' may also be amber colored. Then the lamp 38 will function as turn signal lamp, and the other lamp 38' as backup lamp or, by providing a red filter behind the second inner lens section 28', as tail and stop lamp.

Optionally, a protective cover lens may be provided exteriorly of the outer lens 22. Such a cover lens may be smoke colored. It is also possible to form some lens elements on the inside surface of the cover lens instead of on the inner lens 20 or the outer lens 22.

Alternative Form

I have illustrated in FIGS. 5-9 another preferred form of combination lamp assembly 110 in accordance with my invention. This lamp assembly is a unitary combination of a tail and stop lamp, a backup lamp and a turn signal lamp. The alternative lamp assembly 110 has a lamp housing 112 defining first 114-1, second 114-2 and third 114-3 lighting compartments. The second and third lighting compartments are in side by side arrangement in a horizontal direction, and the third lighting compartment can be thought of as being side by side with the second and third lighting compartments in a vertical direction.

Figure 7:
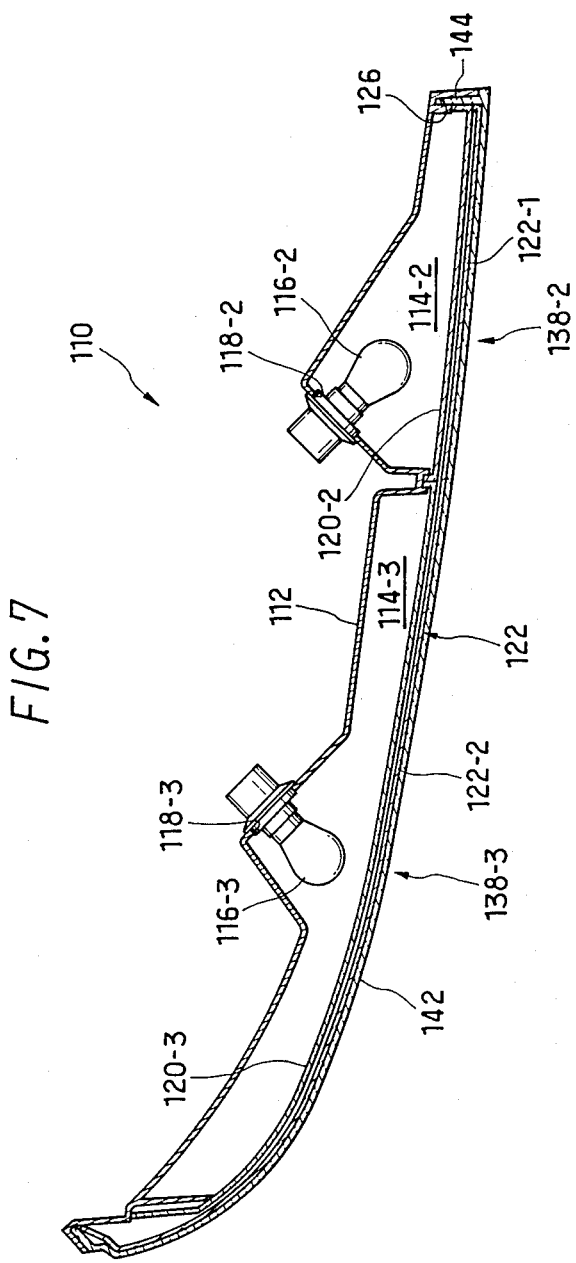
FIG. 7 is a horizontal section through the alternative combination lamp assembly, taken along the line VII—VII in FIG. 6.
Figure 8:
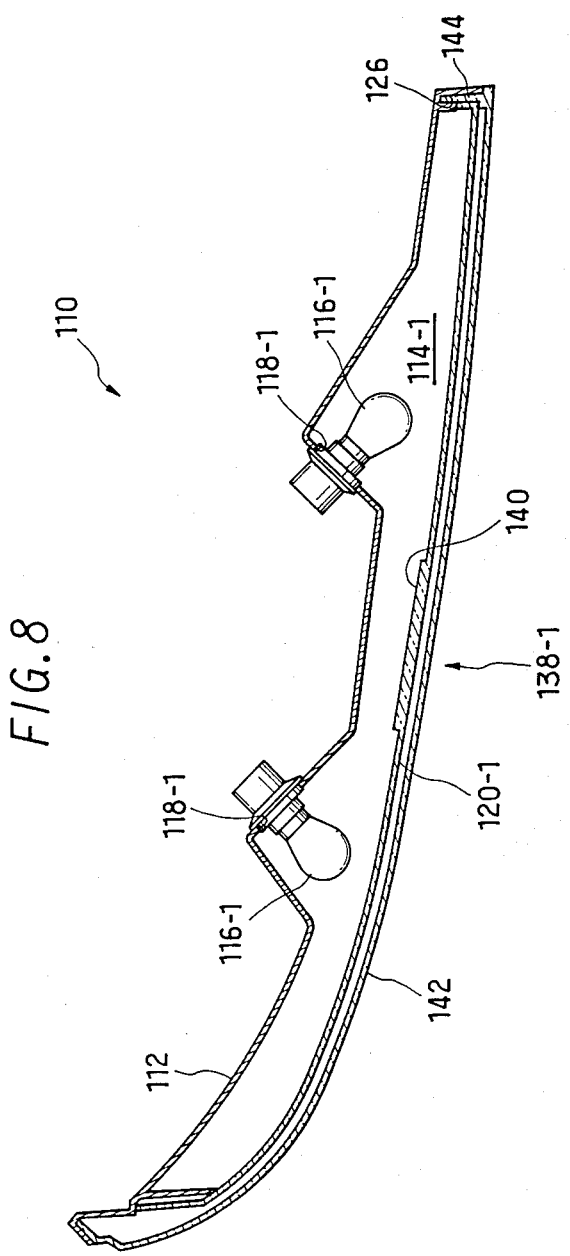
FIG. 8 is also a horizontal section through the alternative combination lamp assembly, taken along the line VIII—VIII in FIG. 6.

The first lighting compartment 114-1 is shown to have two light sources such as bulbs 116-1 mounted in horizontally space part positions therein. The second 114-2 and third 114-3 lighting compartments also have bulbs 116-2 and 116-3, respectively, mounted approximately centrally therein. FIG. 8 reveals a pair of holes 118-1 formed in the rear wall of the first lighting compartment 114-1 for supporting the bulbs 116-1. FIG. 7 reveals holes 118-2 and 118-3 formed in the rear wall of the second 114-2 and third 114-3 lighting compartments for supporting the bulbs 116-2 and 116-3.

Three separate inner lenses 120-1, 120-2 and 120-3 are mounted to the lamp housing 112 so as to close the front ends of the lighting compartments 114-1, 114-2 and 114-3, respectively. I understand that these inner lenses are molded from a plastic to include required surface configurations for serve as lenses. While the three inner lenses are all transparent, the first inner lens 120-1 is colored in transparent red, the second inner lens 120-2 uncolored, and the third inner lens 120-3 colored in amber, in this particular embodiment.

The second 114-2 and third 114-3 lighting compartments are dually closed by a common outer lens 122 disposed forwardly or exteriorly of the second 120-2 and third 120-3 inner lenses. The outer lens 122 is comprised of an alternating arrangement of a plurality or multiplicity of transparent horizontal stripes 134 and a plurality of multiplicity of opaque horizontal stripes 136. The transparent stripes 134 are colorless, and the opaque stripes 136 red in color, in this embodiment.

As has been mentioned in connection with the outer lens 22 of the FIGS. 1-4 embodiment, I recommend that the outer lens 122 be wholly molded from a transparent, colorless plastic. The opaque stripes 136 may be formed by subsequently coating an opaque red paint on the outside surface of the outer lens 122, as best seen in FIG. 9. The uncoated regions of the outer lens 122 will then serve as the transparent stripes 134.

Figure 5:
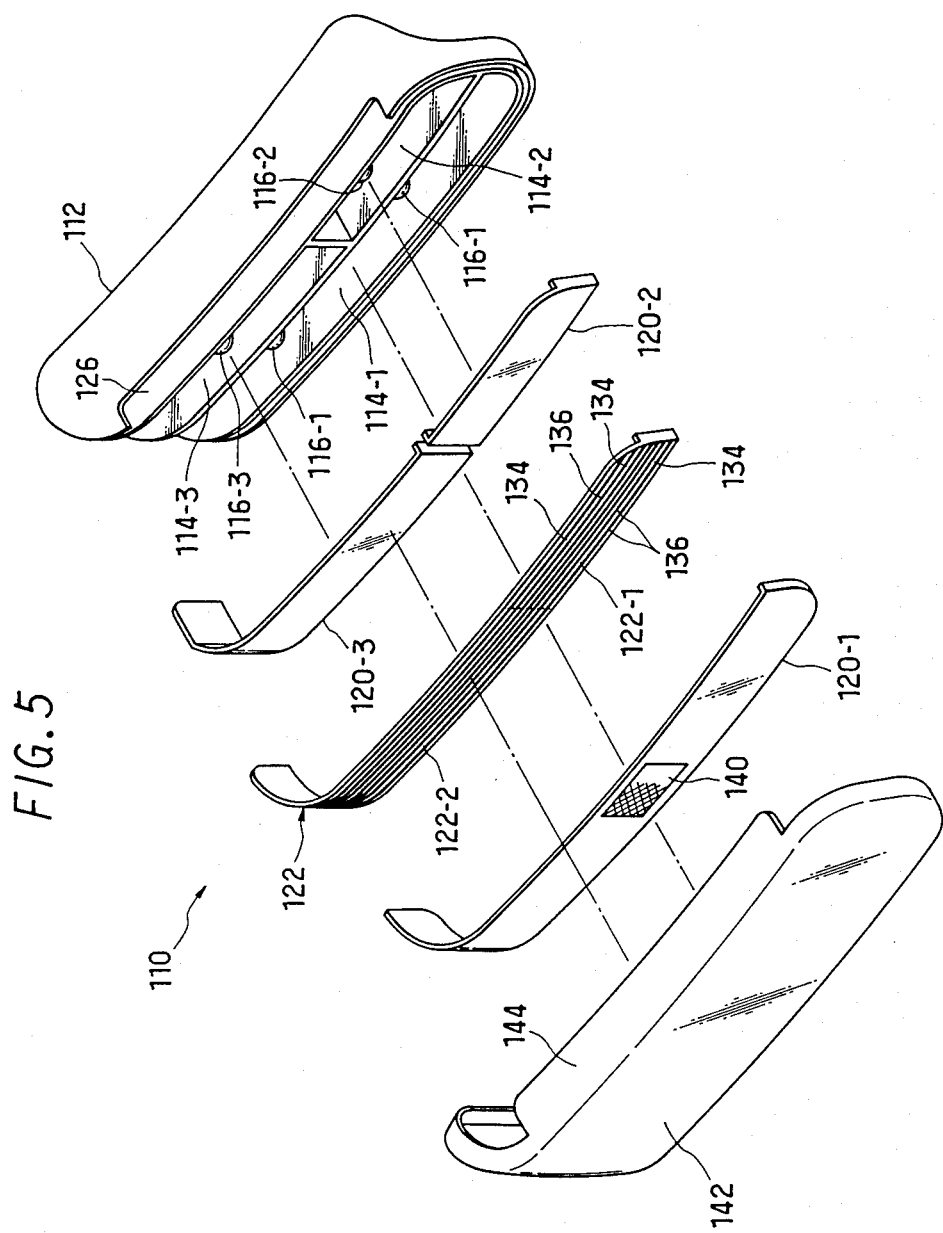
FIG. 5 is an exploded perspective view of another preferred form of combination lamp assembly in accordance with my invention, the alternative lamp assembly being shown as a combination of a tail and stop lamp, a backup lamp and a turn signal lamp.
Figure 6:
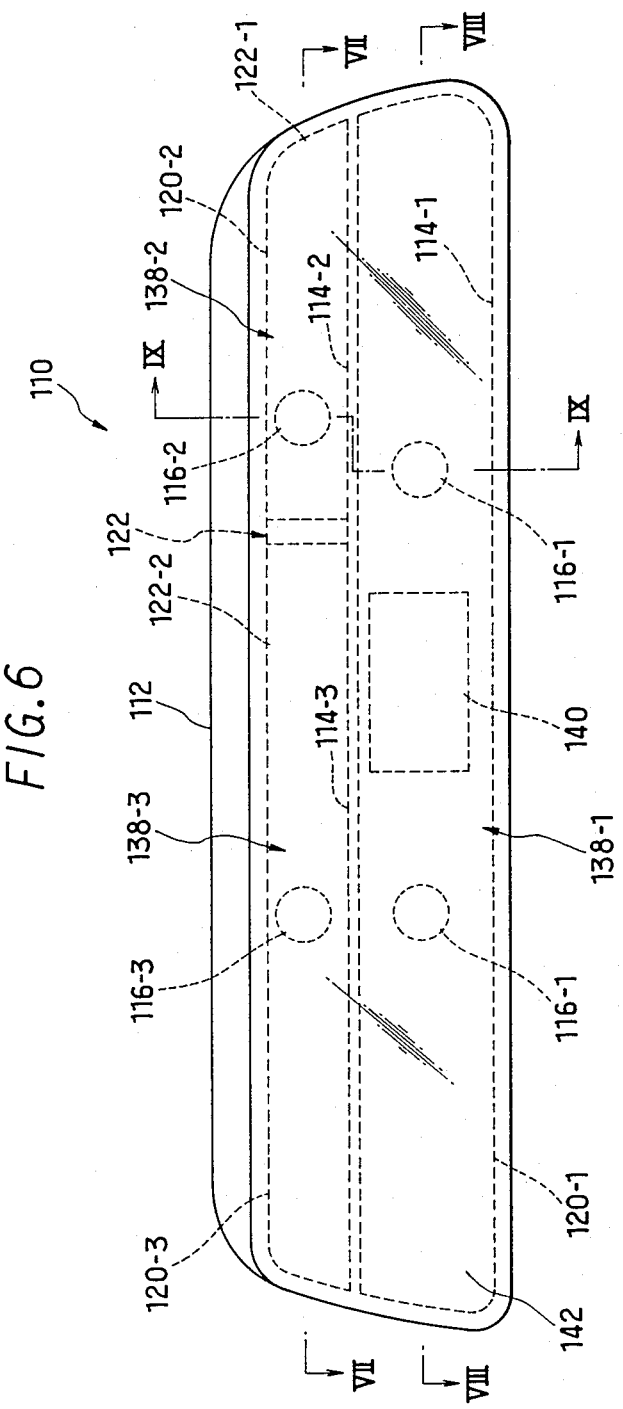
FIG. 6 is an enlarged front elevation of the alternative combination lamp assembly of FIG. 5.

At 140 in FIGS. 5, 6 and 8 is seen a reflex reflector molded in one piece with the first inner lens 120-1 approximately in a central position of its horizontal dimension. As is well known, reflex reflectors are used on vehicles to give an indication to an approaching driver by reflected light from the lamps on the approaching vehicle.

The alternative combination lamp assembly 110 further includes a molded plastic cover lens 142 covering the first inner lens 120-1 and the outer lens 122. The cover lens 142 has a rearwardly turned annular rim 144 extending along its periphery. This rim 144 is press fitted in an annular groove 126 defined in the lamp housing 112 so as to encircle the three lighting compartments 114-1 - 114-3. As the cover lens 142 is so mounted to the lamp housing 112, all the other lenses 120-1 - 120-3 and 122 disposed interiorly of the cover lens is thereby retained in position on the lamp housing.

Such being the construction of the alternative combination lamp assembly 110, it integrally comprises a tail and stop lamp 138-1, a backup lamp 138-2 and a turn signal lamp 138-3. The tail and stop lamp 138-1 comprises the two bulbs 116-1 in the first lighting compartment 114-1 and the first inner lens 120-1. The backup lamp 138-2 comprises the bulb 116-2 in the second lighting compartment 114-2, the second inner lens 120-2, and the first section 122-1 of the outer lens 122. The turn signal lamp 138-3 comprises the bulb 116-3 in the third lighting compartment 114-3, the third inner lens 120-3, and the second section 122-2 of the outer lens 122. The cover lens 142, which is optional, is common to all the lamps 138-1 - 138-3.

When all the bulbs 116-1 - 116-3 are unlit, the tail and stop lamp 138-1 will appear red because of the wholly red coloration of the first inner lens 120-1. The backup lamp 138-2 and the turn signal lamp 138-3 will also appear red because of the illusory effect of the opaque red stripes 136 of the outer lens 122. Thus the three lamps 138-1 - 139-3 constituting the combination lamp assembly 110 will give the illustion of a single lamp unit by reason of their wholly red appearance.

The three lamps 138-1 - 138-3 are to glow in different colors to perform the functions for which they are intended. When the bulbs 116-1 and 116-1 in the first lighting compartment 114-1 are lit up, the tail and stop lamp 138-1 will glow red because of the transparent red coloration of the first inner lens 120-1. The backup lamp 138-2 will glow white as the light emitted by the bulb 116-2 in the second lighting compartment 114-2 passes through the colorless second inner lens 120-2 and the colorless transparent stripes 134 of the first section 122-1 of the outer lens 122. The turn signal lamp 138-3 will glow amber as the light emitted by the bulb 116-3 in the third lighting compartment 114-3 passes through the amber colored third inner lens 120-3 and colorless transparent stripes 134 of the second section 122-2 of the outer lens 122.

This alternative combination lamp assembly 110 is also subject to a variety of modifications in the details of construction as well as in the colors of the lenses. For example, some lenses may be either united or split, and different colors may be employed to provide lamps of different functions. It may also be contemplated to apply the principles of my invention to the lamps 138-2 and 138-3 of the combination lamp assembly 110; in that case, the opaque stripes 136 of the outer lens 122 may be colored in amber.

Additional modifications or alterations of the illustrated embodiments will readily occur to one skilled in the art to conform to design preferences or to the requirements of each specific application of my invention, without departing from the fair meaning or proper scope of the following claims.

I claim:

1. A combination lamp assembly of monochromatic appearance with a capability of glowing in different colors, for use on motor vehicles or the like, comprising:
    (a) a lamp housing defining at least two lighting compartments, each lighting compartment having an open front end;
    (b) a plurality of light sources mounted one in each lighting compartment;
    (c) a first lens section closing the open front end of one of the lighting compartments, the first lens section being transparent and having a prescribed color; and
    (d) a second lens section closing the open front of the other lighting compartment, the second lens section having alternating transparent stripes and opaque stripes, the transparent stripes being colorless, the opaque stripes having substantially the same color as the first lens section.

2. The combination lamp assembly of claim 1 wherein the the second lens section is wholly transparent and colorless, and wherein the opaque stripes are stripes of an opaque material formed in parallel spaced relation to one another on the surface of the second lens section.

3. The combination lamp assembly of claim 2 wherein the opaque stripes are coatings of an opaque paint.

4. The combination lamp assembly of claim 1 wherein the first and second lens sections are of one piece construction.

5. A combination lamp assembly of monochromatic appearance with a capability of glowing in different colors, for use on motor vehicles or the like, comprising:
    (a) a lamp housing defining first and second lighting compartments in side by side relation, each lighting compartment having an open front end;

(b) first and second light sources mounted in the first and second lighting compartments, respectively;

(c) first and second inner lenses closing the open front ends of the first and second lighting compartments, respectively; and (d) a common outer lens mounted to the lamp housing and comprising:

(1) a first lens section disposed forwardly or exteriorly of the first inner lens, the first lens section being transparent and having a prescribed color; and (2) a second lens section disposed forwardly or exteriorly of the second inner lens, the second lens section having alternating transparent stripes and opaque stripes, the transparent stripes being colorless, the opaque stripes having the same color as the first lens section.

6. The combination lamp assembly of claim 5 wherein the second lens section of the outer lens is wholly transparent and colorless, and wherein the opaque stripes are coatings of an opaque paint formed in parallel spaced relation to one another on the surface of the second lens section.

7. A combination lamp assembly of monochromatic appearance with a capability of glowing in different colors, for use on motor vehicles or the like, comprising:

(a) a lamp housing defining first, second and third lighting compartments each having an open front end;

(b) at least one light source mounted in each of the first, second and third lighting compartments;

(c) a first inner lens closing the front end of the first lighting compartment, the first inner lens having a first prescribed color;

(d) a second inner lens closing the front end of the second lighting compartment, the second inner lens being colorless;

(e) a third inner lens closing the front end of the third lighting compartment, the third inner lens having a second prescribed color; and (f) an outer lens disposed forwardly or exteriorly of the second and third inner lenses and having alternating transparent stripes and opaque stripes, the transparent stripes being colorless, the opaque stripes having the first prescribed color.

8. The combination lamp assembly of claim 7 wherein the outer lens is transparent and colorless, and wherein the opaque stripes are coatings of an opaque paint formed in parallel spaced relation to one another on the surface of the outer lens.

9. The combination lamp assembly of claim 7 further comprising a cover lens mounted to the lamp housing so as to cover the first inner lens and the outer lens.

* * * * *